March 9, 1971  R. R. CLARK  3,568,333
HEART FOR TEACHING AND PRACTICING EXTERNAL CARDIAC COMPRESSION
Filed June 27, 1969  2 Sheets-Sheet 1
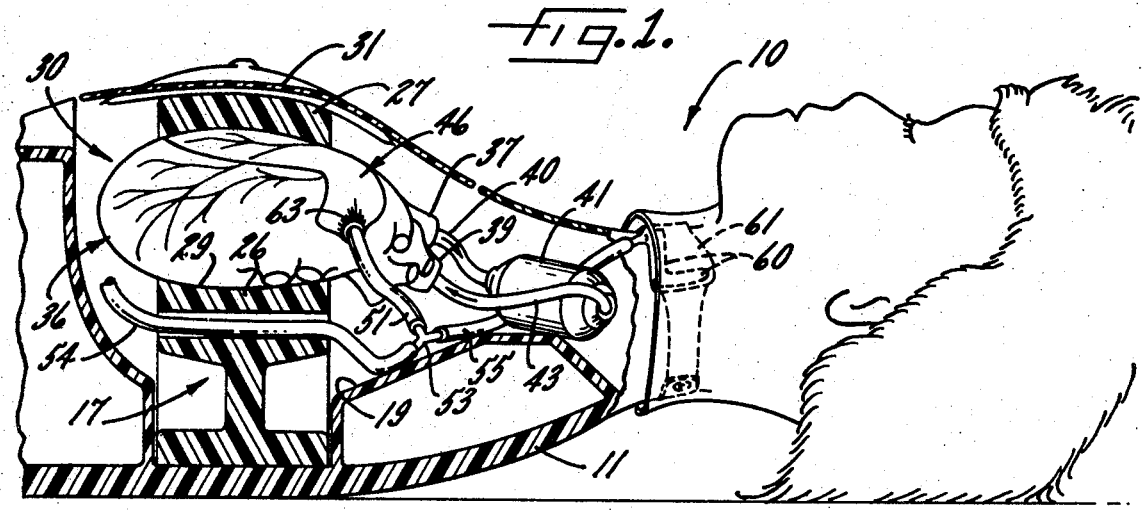
INVENTOR.
ROLAND R. CLARK,
BY
Wolfe, Hubbard, Voit & Osann
ATTORNEYS.

March 9, 1971  R. R. CLARK  3,568,333
HEART FOR TEACHING AND PRACTICING EXTERNAL CARDIAC COMPRESSION
Filed June 27, 1969  2 Sheets-Sheet 2

INVENTOR.
ROLAND R. CLARK,
BY
Wolfe, Hubbard, Voit & Osann
ATTORNEYS.

United States Patent Office 3,568,333
Patented Mar. 9, 1971

3,568,333
HEART FOR TEACHING AND PRACTICING EXTERNAL CARDIAC COMPRESSION
Roland R. Clark, Rockford, Ill., assignor to Medical Supply Company, Rockford, Ill.
Filed June 27, 1969, Ser. No. 837,202
Int. Cl. G09b 23/34
U.S. Cl. 35—17                                         6 Claims

ABSTRACT OF THE DISCLOSURE

A simulated molded heat located between the sternum and spine of a simulated thorax unit is squeezed and released as compressive forces are alternately applied to and released from the thorax unit. The heart includes a liquid chamber from which blood-colored liquid is pumped when the heart is compressed for flow into a transparent circulatory system, and includes an air chamber from which air pulses are emitted for actuating a pressure gage and pulsating a simulated carotid artery. The air chamber is formed within a separately molded insert adapted to interfit with the main portion of the heart defining the liquid chamber.

BACKGROUND OF THE INVENTION

This invention relates to a simulated human heart for use in teaching the principles of external cardiac compression. More particularly, the invention constitutes an improvement over the heart disclosed in Baermann et al. application Ser. No. 803,608 filed Mar. 3, 1969, and assigned to the same assignee as the present application, wherein compressive forces applied manually to the heart cause a flow of blood-like liquid from the heart through a simulated circulatory system and also result in the creation of air pulses for actuating a pressure gage and for pulsating a simulated carotid artery.

SUMMARY OF THE INVENTION

The primary aim of the present invention is to provide a new and improved simulated heart capable of circulating liquid and producing air pulses when compressed manually, the heart being simpler in construction and more trouble-free in service use, being more realistic in appearance, and producing air pulses more nearly representative of the applied compressive forces than prior arrangements of the same general type. A more detailed object is to achieve the foregoing by forming the heart itself with two chambers, one chamber pumping the liquid and the other chamber producing the air pulses when the heart is compressed.

The invention also resides in the novel construction of the two chambers as interfitting units to enable the formation of both chambers within the heart by comparatively simple molding techniques while maintaining the realistic appearance of the heart.

Other objects and advantages of the invention will become apparent from the following detailed description when taken in conjunction with the accompanying drawings.

BRIEF DESCRIPTION OF THE DRAWINGS

FIG. 1 is a fragmentary elevation of a training manikin equipped with a new and improved heart embodying the novel features of the present invention.

FIG. 2 is a fragmentary plan view of the heart and the circulatory system, the pressure gage being shown in perspective.

DETAILED DESCRIPTION OF THE PREFERRED EMBODIMENT

Figure 3:
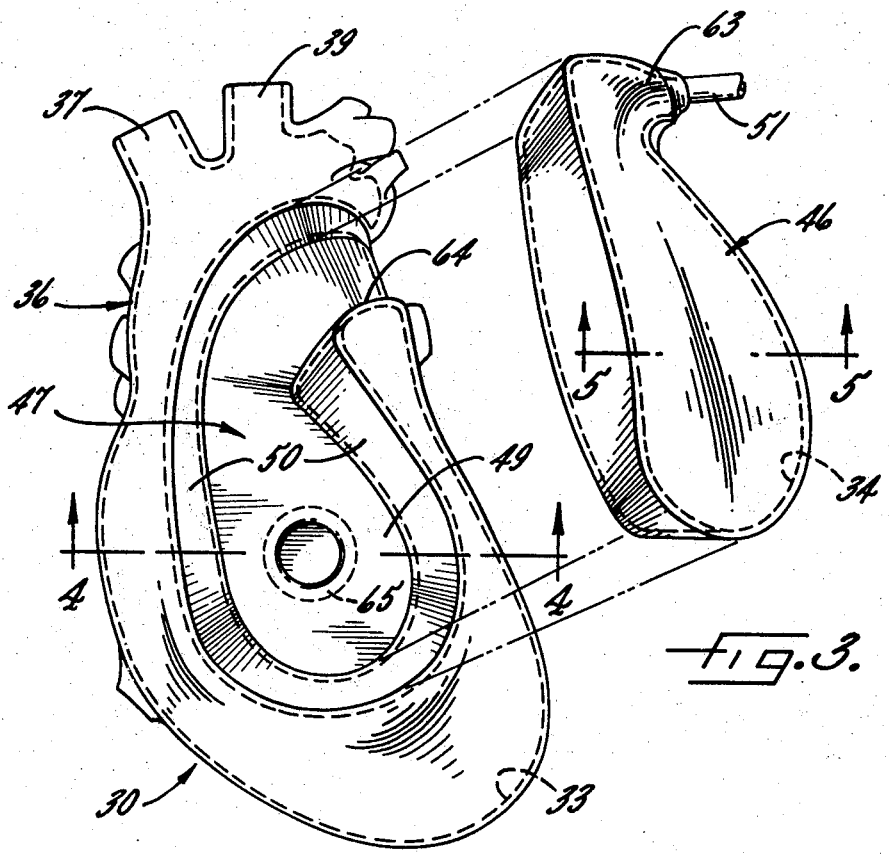
FIG. 3 is an exploded perspective view of the two interfitting units of the heart.

For purposes of illustration, the invention is shown in the drawings in conjunction with a training manikin 10 which is adapted for use in teaching and practicing the principles of external cardiac compression (ECC). It is well known that ECC, otherwise known as closed chest cardiac massage, is an effective method of keeping an inert human heart pumping blood for an extended period of time. In massaging the heart externally, the rescuer places the heel of one of his hands on the lower part of the victim's sternum and places his other hand over the first while alternately pressing downwardly on the sternum and then relieving the pressure. The chest thus may be compressed to squeeze the heart between the sternum and the spinal column and to force the blood out of the heart ventricles. When the pressure is released, the chest re-expands and the heart refills with blood. It is essential that the rescuer be thoroughly trained and experienced in the techniques of ECC since improper placement of the hands or the application of excessive pressure can result in fracturing of the ribs, laceration of the liver or regurgitation of the stomach contents into air passages. The training manikin 10 is used in the teaching and practicing of the principles of ECC to enable trainees to learn the proper techniques.

More particularly and as shown in FIG. 1, the manikin 10 comprises a torso 11 which is molded of relatively rigid flesh-colored plastic and which is sized and shaped almost exactly the same as the torso of a young woman. An anatomically correct thorax unit 17 is located in an upwardly opening chest cavity 19 within the torso 11 and is constructed to resist compression to the same degree as a human thorax. The thorax unit is a one-piece molding of resiliently compressive material such as vinyl plastic, is of the same cross-section as a human thorax, and includes a simulated spinal column 26 and a simulated sternum 27.

Located between the spinal column 26 and the sternum 27 and extending through the thorax unit 17 is an opening 29 for receiving a resiliently compressible bulb-like member 30 which simulates a human heart. When external compression is alternately applied to and removed from the thorax unit by pressing on a transparent chest plate 31 overlying the unit, the sternum is flexed toward and away from the spinal column to squeeze and release the heart 30 in the same manner as a human heart undergoing ECC.

Figure 4:
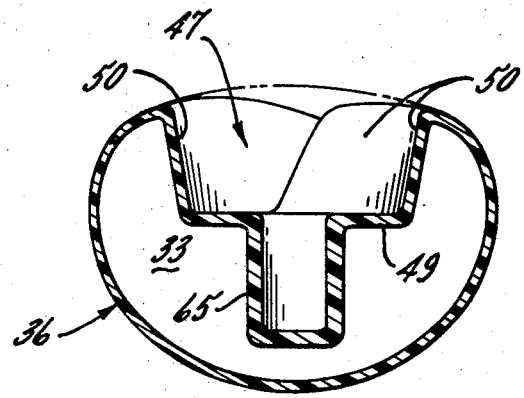
FIG. 4 is a cross-section taken substantially along the line 4—4 of FIG. 3.
Figure 5:
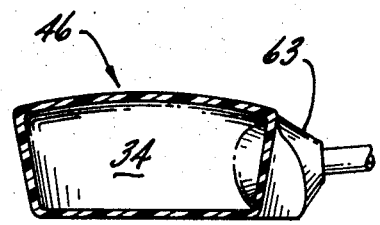
FIG. 5 is a cross-section taken substantially along the line 5—5 of FIG. 3.

In accordance with the present invention, the simulated heart 30 itself is formed with both a liquid chamber 33 and an air chamber 34 (FIGS. 2, 4 and 5). In response to the application of compressive forces to the heart, blood-colored liquid 35 is pumped from the liquid chamber 33 to enable the trainee to see the circulation resulting from the compression and, at the same time, an air pulse is produced within the air chamber 34 and is used to give an indication of the magnitude of the pressure being applied to the heart. With both chambers being contained within the heart, the overall arrangement for producing the liquid circulation and the air pulses not only is simplified and more rugged and trouble-free in service use but also is more realistic in appearance and is capable of providing a more nearly correct representation of the applied compressive forces.

In the present instance, the liquid chamber 33 is defined by a hollow cavity within a bulb 36 which forms the main part of the heart 30, the bulb being molded of resilient vinyl plastic and being sized and shaped generally the same as a human heart. The bulb is molded with a simulated aorta 37 and vena cava 39 (FIGS. 2 and 3) defining an outlet and an inlet, respectively, communicating with the chamber 33, is formed with other external tubular protrusions, branch veins and arteries simulating those of a human heart, and is colored generally the same as a human heart. With the thorax unit 17 and the heart 30 being made of plastic and being constructed as shown, approximately 80 pounds of force must be applied to the sternum 27 to flex the latter through a distance of 1½ to 2 inches. The thorax unit and the heart thus are anatomically correct and provide the same resistance to compression as a human thorax.

When the bulb 36 is squeezed between the sternum 27 and the spinal column 29 as a result of compression of the thorax unit 17, a surge of the blood-like liquid 35 in the chamber 33 is pumped from the aorta 37 into a simulated circulatory system. Herein, the circulatory system comprises a transparent tube 40 (FIG. 2) communicating with the aorta, a compressible vinyl container or accumulator 41 connected to the tube, and a second transparent tube 43 connected between the reservoir and the vena cava 39. As the bulb 36 is squeezed and released, the liquid is pumped from the chamber 33 to the accumulator through the tube 40 and then back to the chamber through the tube 43. One-way valves 44 and 45 (FIG. 2) in the aorta 37 and the vena cava 39, respectively, prevent the liquid from circulating reversely. Because of the transparency of the tubes, the trainee may watch the blood-colored liquid circulate and thus may see the results of performing cardiac compression in a proper manner.

Advantageously, the air chamber 34 is defined within an insert 46 (FIGS. 3 and 5) which is formed separately from the main bulb 36 of the heart 30 to facilitate molding of the bulb and the insert. The insert is shown most clearly in FIGS. 3 and 5 and comprises a bulb-like member molded of resilient vinyl plastic and formed with a sealed hollow interior defining the air chamber 34. The insert is adapted to fit removably into a recess 47 (FIGS. 3 and 4) formed in the bulb 36 and, when the insert is fitted into the recess, the upper side of the insert lies generally flush with and forms a continuation of the upper side of the bulb (see FIG. 1) so that the upper side of the heart simulates that of a human heart.

As shown most clearly in FIGS. 3 and 4, the recess 47 is molded into and opens upwardly out of the upper side of the bulb 36 and is defined by a bottom wall 49 and upright side walls 50, the inner surfaces of such walls defining part of the liquid chamber 33. The recess is sized and shaped in accordance with the size and shape of the insert 46 and thus the latter seats into and mates nearly perfectly with the recess with the upper side of the insert flush with the upper side of the bulb 36 and without any appreciable intervening gaps existing between the upright sides of the insert and the side walls 50 of the recess.

With the foregoing arrangement and when the thorax unit 17 is compressed, the insert 46 is squeezed between the sternum 27 and the bottom wall 49 of the recess 47 to reduce the volume of the air chamber 34 and thus produce an air pulse in a line 51 (FIG. 2) communicating at one end with the air chamber. At its other end, the line communicates with a Y-fitting 53 to which are connected two additional lines 54 and 55. The line 54 leads to and communicates with a pressure gage 56 (FIG. 2) and, when the air pulse is produced in the line 51, an indicating needle 57 of the gage is deflected across a color-calibrated dial 59 through a distance approximately proportional to the pressure exerted on the thorax unit 17 to compress the insert 46 and produce the air pulse. As a result, the instructor and the trainee can determine if the trainee is applying pressure within such a range as to restore circulation to the heart but without causing injury to the victim. The line 55 is connected to tubular branches 60 (FIG. 2) formed in a simulated carotid artery unit 61 that may be strapped around the neck of the manikin 10. When the air pulse is produced in the line 51 as a result of compression of the insert 46, the branches 60 are pulsated by the air flowing through the line 55. The trainee can detect and distinctly feel the pulses in the branches when ECC is being properly performed.

As shown in FIGS. 1 to 3, the line 51 advantageously is connected into the end of a laterally projecting, offset neck 63 of the insert 46. The neck fits into a laterally extending portion 64 of the recess 47 (FIG. 3), such laterally extending portion opening out of one of the upright side walls of the bulb 36, and thus the line 51 may be extended unencumbered from the side of the heart rather than from the top thereof and simulates a pulmonary vein.

To insure that the insert 46 will be compressed when pressure is applied to the thorax unit 17, an upright hollow post 65 (FIG. 4) is molded integrally with the bottom wall 49 of the recess 47 and extends downwardly through the liquid chamber 33 toward the lower side of the bulb 36. When the insert and the bulb are flexed downwardly, the lower end of the post bears against the lower side of the bulb to limit flexure of the bottom wall 49 and thus insure that the air chamber 34 will be compressed to produce the air pulse. In addition, the post reinforces the bottom wall 49 and guards against tearing of the latter away from the side walls 50 of the recess 47. By molding the post integrally with the bottom wall of the recess and by coring the post from the upper side of the normally concealed bottom wall, no core hole is left opening out of an exposed part of the heart 30 as would be the case if the post were molded integrally with and cored from the lower side of the bulb.

From the foregoing, it will be apparent that the present invention brings to the art a new and improved simulated heart 30 with separately formed chambers 33 and 34 capable of circulating liquid and producing air pulses when the heart is compressed. With the chambers 33 and 34 being formed within the separately molded bulb 36 and insert 46, respectively, molding of the heart is facilitated without the need of elaborate coring and yet the bulb and the insert interfit with one another to simulate the appearance of an actual heart. The molded heart is simple but rugged in construction and is capable of selectively being used without the pressure gage 56 and the artery unit 61 since the liquid 35 flows within its own closed circuit and need not be transmitted to the gage or the artery unit. In addition, the novel heart together with the thorax unit 17, is anatomically correct and, with the insert 46 located directly within the opening 29 in the thorax unit in overlying relation with the bulb 36, the air pulses produced in the line 51 are more directly correlated with the magnitude of the compressive forces applied to the thorax unit thereby to provide a more accurate measure of the trainee's proficiency.

I claim as my invention:

1. A simulated heart for use in teaching and practicing the principles of external cardiac compression, said heart comprising a resiliently compressible bulb sized and shaped generally the same as a human heart and defining a chamber, said chamber containing liquid and having an inlet and an outlet through which said liquid is pumped in response to compressive forces being alternately applied to and removed from said bulb, a sealed accumulator disposed outside of said container, and transparent tubes connecting said accumulator to said inlet and outlet whereby liquid pumped from said chamber may flow through said accumulator and back to said chamber and may be seen during such flow, the improvement in said heart comprising, a recess formed in and opening out of one side of said bulb and having side and bottom walls whose inner surfaces define part of said chamber, a compressible bulb-like insert correlated in size and shape with the recess and fitted into the latter with its outer side generally flush with and forming a continuation of said one side of said bulb, said insert defining an air chamber separate from said liquid chamber, and a line communicating with said air chamber to receive a pulse of air therefrom in response to the application of compressive forces to said bulb and said insert.

2. A heart as defined in claim 1 in which said recess opens upwardly out of the top of said bulb and includes a laterally extending portion opening out of an upright side of the bulb, said insert including a laterally projecting neck fitted into said laterally extending portion of said recess, and said line being connected into the outer end of said neck.

3. A heart as defined in claim 1 further including a post extending through said liquid chamber between the other side of said bulb and the bottom wall of said recess and helping support said bottom wall when said bulb and said insert are compressed.

4. A heart as defined in claim 3 in which said post is formed integraly with the bottom wall of said recess and bears against said other side of said bulb when the latter is compressed.

5. A simulated heart for use in teaching and practicing the principles of external cardiac compression, said heart comprising a molded compressible bulb defining a chamber, said chamber containing liquid and having an inlet and an outlet through which said liquid is pumped in response to compressive forces being alternately applied to and released from said bulb, and an at least partially transparent simulated circulatory system connected to said inlet and outlet and disposed outside of said chamber whereby liquid pumped from said chamber may flow through said circulatory system and back to said chamber and may be seen during such flow, the improvement in said heart comprising, a recess formed in and opening out of one side of said bulb, a molded compressible bulb-like insert correlated generally in size and shape with said recess and fitted removably into the latter with its outer side forming a continuation of said one side of said bulb, said insert defining an air chamber separate from said liquid chamber, and a line communicating with said air chamber to receive a pulse of air therefrom in response to the application of compressive forces to said bulb and said insert.

6. A simulated heart for use in teaching and practicing the principles of external cardiac compression, said heart comprising a molded compressible bulb-like unit sized and shaped generally the same as a human heart, a liquid chamber within said heart and having an inlet and an outlet through which liquid is pumped in response to compressive forces being alternately applied to and released from said heart, an at least partially transparent circulatory system connected to said inlet and said outlet and disposed outside of said chamber whereby liquid pumped from the chamber may flow through said circulatory system and back to said chamber and may be seen during such flow, an air chamber formed in said heart and sealed off from said liquid chamber, and a line communicating with said air chamber to receive a pulse of air therefrom in response to the application of compressive forces to said heart.

References Cited
UNITED STATES PATENTS

| | | | |
|---|---|---|---|
| 3,209,469 | 10/1965 | James | 35—17 |
| 3,276,147 | 10/1966 | Padellford | 35—17 |

HARLAND S. SKOGQUIST, Primary Examiner